United States Patent [19]
Cocca

[11] Patent Number: 5,394,206
[45] Date of Patent: Feb. 28, 1995

[54] ORIENTATION INDEPENDENT, DETACHABLE FILM CARTRIDGE, MEMORY MODULE

[75] Inventor: J. David Cocca, Pittsford, N.Y.

[73] Assignee: Eastman Kodak Company, Rochester, N.Y.

[21] Appl. No.: 71,084

[22] Filed: Jun. 4, 1993

[51] Int. Cl.$^6$ ............................................... G03B 7/00
[52] U.S. Cl. .................................................. 354/21
[58] Field of Search ......................... 354/106, 21, 275

[56] References Cited

U.S. PATENT DOCUMENTS

| | | | |
|---|---|---|---|
| 4,038,599 | 7/1977 | Bove et al. | 324/158 F |
| 4,443,077 | 4/1984 | Tanikawa | 354/21 |
| 4,500,183 | 2/1985 | Tanikawa | 354/21 |
| 4,806,959 | 2/1989 | Townsend | 354/21 |
| 4,887,105 | 12/1989 | Ishikawa et al. | 354/21 |
| 4,945,365 | 7/1990 | Fujino | 354/21 |
| 4,947,196 | 8/1990 | Wash et al. | 354/76 |
| 4,962,397 | 10/1990 | Ishikawa et al. | 354/21 |
| 4,965,626 | 10/1990 | Robison et al. | 355/40 |
| 5,016,030 | 5/1991 | Dwyer et al. | 354/21 |
| 5,032,855 | 7/1991 | Taniguchi et al. | 354/21 |
| 5,034,854 | 7/1991 | Smart et al. | 354/21 |
| 5,036,344 | 7/1991 | Inoue et al. | 354/106 |
| 5,070,355 | 12/1991 | Inoue et al. | 354/413 |
| 5,097,279 | 3/1992 | Sakamoto et al. | 354/106 |
| 5,142,310 | 8/1992 | Taniguchi et al. | 354/106 |
| 5,146,249 | 9/1992 | Koda et al. | 354/21 |

FOREIGN PATENT DOCUMENTS

| 0342627 | 11/1989 | European Pat. Off. . |
| 0342628 | 11/1989 | European Pat. Off. . |

*Primary Examiner*—Michael L. Gellner
*Assistant Examiner*—Nicholas J. Tuccillo
*Attorney, Agent, or Firm*—David M. Woods

[57] ABSTRACT

A memory module, releasably attached to the end of a film cartridge, includes a set of conductive arcuate segments surrounding a centrally disposed conductive pad accessible through an upper surface of the module, and non-volatile memory attached to the conductive pad and the arcuate segments. The memory module is positioned so that the conductive pad and arcuate segments can make electrical contact with data recording and reading terminal pins of camera and film processing equipment. The terminal pins include a centrally disposed pin and further pins positioned circularly around the centrally disposed pin to extend into the module and contact the respective conductive pad and segments, so that at least one terminal pin is in contact with each conductive pad and segment. By having a greater number of contact terminals than there are conductive pads and segments, the electronic operating system, on detecting the presence of an inserted cartridge, can identify which of the circularly arranged terminal pins is contacting which of the conductive arcuate segments, and thereafter initiate processing and storage of data in the nonvolatile memory.

23 Claims, 4 Drawing Sheets

ORIENTATION INDEPENDENT, DETACHABLE FILM CARTRIDGE, MEMORY MODULE

CROSS-REFERENCE TO RELATED APPLICATIONS

This application discloses subject matter related to subject matter disclosed in commonly assigned U.S. patent application Ser. No. 08/071,096 entitled ORIENTATION INDEPENDENT, DETACHABLE FILM CARTRIDGE, MEMORY MODULE filed on even date herewith in the name of Robert S. Bryant.

1. Field of the Invention

This invention relates to the field of photographic film cameras and film processing, and particularly to apparatus for providing non-volatile, electronic information storage and retrieval capabilities for a standard film cartridge.

2. Background of the Invention

As set forth in commonly assigned U.S. Pat. No. 5,032,854 to Smart et al., it is well known to provide limited information relating to film type and speed by means of a DX code or bar code imprinted on the exterior case or end of the film cartridge that may be electrically or optically read in to the camera's electronic control system. Such well known coding is employed to set exposure parameters of the camera automatic exposure control system, but is not useful in storing information related to the actual exposure made of an individual image frame in use of the camera.

In order to store such information, as well as the image frame identification to which it pertains, and other information automatically entered from the camera operating system or optionally entered by the camera user, it is necessary to employ a further writable and readable media in association with either the film or the film cartridge.

For example, commonly assigned U.S. Pat. Nos. 4,965,626 and 5,016,030 to Robinson et al. and Dwyer et al. (and applications listed therein) disclose photographic film incorporating magnetic read/write strips and read/write heads and systems incorporated into cameras and photo-finishing equipment for storing and reading out a wide variety of data.

Alternatively, it has been proposed to magnetically read and write data on magnetic strips formed on the sides or an end of the film cartridge, as described, for example, in U.S. Pat. No. 4,443,077 to Tanikawa.

More recently, it has been suggested that data may be stored and retrieved from non-volatile memory chips, e.g. an EEPROM, incorporated in an integrated circuit chip "card" as set forth in U.S. Pat. No. 5,036,344 to Inoue et al. The card may be separable from the camera and film cartridge or may be attached to the film cartridge as set forth generally in U.S. Pat. No. 5,070,355 to Inoue et al.

Alternatively, the storage of such information in "ROM-ICs" attached permanently or releasably to the sides or ends of film cartridges is disclosed in U.S. Pat. No. 5,032,855 to Taniguchi et al. The various embodiments of the ROM-ICs illustrated in the '855 patent are adapted to have a pattern of electrically conductive contact pads recessed in holes that are adapted to receive spring-loaded terminal pins when the cartridge is correctly positioned in the camera body or photo-finishing equipment. The disclosed system operates to store and retrieve data from an EEPROM in the ROM-IC during the exposure of the film in the cartridge and its subsequent processing and the print making.

The disclosed embodiments of the '855 patent appear to require that the film cartridge be especially designed to have a film containing section and a ROM-IC containing section that is either permanently attached or releasably attached to the end of the cylindrical film cartridge. The releasable attachment methods presented appear to be positionally sensitive to obtain a precise orientation of the pattern of access holes and contact pads to the array of terminal pins. In order to facilitate this alignment, the film cartridges illustrated and described appear to be modified from the standard 35 mm cartridge.

The problem remains of providing a discrete memory module for storing data written in during exposure of film image frames identifying the frame number, exposure data, date of exposure, and other data automatically or electively written in for subsequent read-out and use in the developing and photo-finishing operations that is useable with standard film cartridges. The introduction of modified or non-standard film cartridges to incorporate on-board memory capabilities presents difficulties in gaining acceptance and increases costs of manufacturing, distributing and stocking and may lead to customer confusion and dissatisfaction. The use of positionally sensitive, end fitting, memory modules as disclosed in the '855 patent leads to difficulties in accurately positioning the modules and errors in use.

SUMMARY OF THE INVENTION

It is therefore an object of the present invention to provide a read/write memory module for releasable attachment to the end of a film cartridge that may be employed with standard film cartridges and is not positionally sensitive.

In accordance with these and other objects of the present invention, a memory module for a film cartridge in which information related to the camera exposure of film image frames may be recorded in non-volatile memory for subsequent read-out, the memory module having a module housing having an upper and a lower surface, an integrated circuit chip, including a memory, attached within the module housing and having a plurality of input and output terminals, and means for attaching the disc-shaped module housing to the end of a film cartridge so that the upper surface is exposed for making electrical contact with data recording and read out terminal pins of camera and film processing equipment, is characterized by a substrate having a first plurality of conductive contact surfaces spaced apart and electrically isolated from one another and formed in a predetermined pattern, means for making electrical connections between the first plurality of input and output terminals of the integrated circuit chip memory and the plurality of conductive contact surfaces; and means for positioning the substrate so that the conductive contact surfaces face toward the upper surface of the disc-shaped module housing and may be contacted by a second plurality of the data recording and read out terminal pins when the memory module is positioned in respect thereto, wherein the second plurality is greater than the first plurality.

In accordance with the invention, the memory module further comprises a disc-shaped housing of insulating material disposing the substrate so that the plurality of conductive contact surfaces may contact the second plurality of terminal pins and enclosing the integrated circuit chip and having a second surface for contacting the end of the film cartridge, the second surface having a snap-on lid for attaching the module to the rim of the film cartridge.

Preferably, the substrate includes a conductive pad disposed at the central point of the disc-shaped housing, and the means for making electrical connections includes means for connecting the conductive pad to a power terminal of the integrated circuit chip. Furthermore, the plurality of contact surfaces is preferably arranged on the substrate in spaced-apart arcuate segments positioned in a band surrounding the centrally disposed conductive pad.

In use, the detachable memory module is employed in a camera system for recording information related to the camera exposure parameters of film image frames for subsequent read-out, wherein the camera further comprises a camera body for receiving the film cartridge with the attached memory module in a cartridge receiving chamber, the second plurality of contact terminal pins is positioned by the camera housing to extend into the cartridge receiving chamber and bear against and make electrical contact with the respective centrally disposed conductive pad and the plurality of conductive contact surfaces, and power, timing and data signals may be stored in the non-volatile memory through the plurality of contact terminal pins and the respective conductive contact surfaces and pad.

In particular, n conductive arcuate segments are formed in a circular band and are distributed around the arc of the band with respect to $n+1$ equally spaced camera or film processing equipment terminal pins which are coupled to the camera's processing unit. The $n+1$ terminal pins all bear against the region of the circular band when the memory module and film cartridge are inserted in a film cartridge receptacle of a camera body. When so inserted, at least n of the $n+1$ terminal pins separately contact the respective n conductive arcuate segments, whereas the additional 1 terminal either contacts one of the n conductive arcuate segments or contacts an insulating space between and separating the adjacent arcuate segments. Each of the n arcuate shaped segments is connected to a respective input or output of the memory in the IC chip of the detachable memory module.

In use, when the film cartridge with the attached memory module is so inserted into the cartridge receptacle of the camera body and contact is made between the $n+1$ camera terminal pins and the n arcuate segments, the camera processing unit institutes a test sequence to identify which of the $n+1$ camera terminal pins are in contact with the n arcuate segments, which is unknown on insertion, so that n of the camera terminal pins are identified for input and output of power, data and clock signals. In the initial step of the process, the processing unit is able to determine which, if any, of the $n+1$ terminal pins are commonly contacting a single one of the n arcuate segments by their common electrical connection through the segment, and only one of the commonly contacting terminal pins is selected. Moreover, if any terminal pin is in contact with an insulating portion of the memory module, the lack of a bias voltage state or ground can be detected, and that terminal pin may be disregarded, leaving in either case a set of n terminal pins known to be in contact with n arcuate segments.

After a set of n terminal pins is identified as being in contact with n arcuate segments, the identification of the n arcuate segments is commenced by making successive assumptions of the identity and testing those assumption by applying a set of test signals. Once an assumption tests correct, the terminal identifications are memorized in the camera electronic control system and employed during read and write operations from and to the IC chip.

In a further variation, the n conductive arcuate segments are made unequal in length and the number of terminal pins may be selected so that at least two adjacent terminal pins always contact one of the larger segments. The longer segment may thus be determined at the outset and assumptions may be made as to the segments contacted by the remaining terminal pins due to the known geometry of the terminal spacing and the segment spacing. In one example, $n+2$ terminal pins may be equally spaced apart to make contact with the band occupied by the n conductive arcuate segments.

Advantages and Effects of the Invention

The memory module of the present invention may advantageously be employed in such a camera and in associated photo-finishing equipment to store the wide variety of data described in the above referenced patents. More particularly, the memory module of the present invention may be readily attached to the end of a standard film cartridge in any position thereon, since the conductive bands on the upper surface thereof are not positionally sensitive about the axis of the cartridge, and contact may be made with the associated read/write contact terminal pins even if the attachment is somewhat off center. Since the memory module is detachable from the standard cartridge and the EEPROM stored data may be erased and rewritten, the memory module is reusable.

BRIEF DESCRIPTION OF THE DRAWINGS

These and other objects, advantages and features of the invention will be become apparent from the detailed description given hereinafter in relation to the accompanying drawings, in which.

The drawings are not necessarily to scale.

DETAILED DESCRIPTION OF THE PREFERRED EMBODIMENTS OF THE INVENTION

Figure 1:
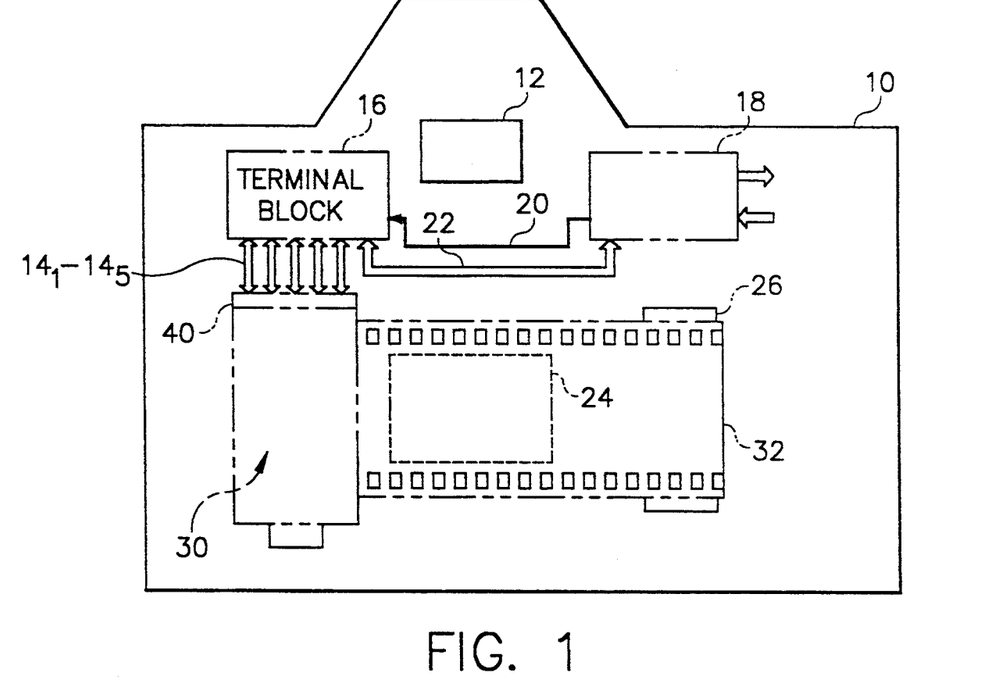
FIG. 1 is a schematic elevation view depicting the relation of a camera body and film cartridge and the camera terminal pins for making contact with the memory module of the present invention.

Turning now to FIG. 1, it illustrates schematically the relationship of a camera body 10 and viewfinder 12 with respect to a loaded film cartridge 30 having a memory module 40 attached at one end thereof. The film cartridge 30 and attached memory module 40 are shown in perspective view in FIG. 2. The film cartridge 30 has a length of film 32 withdrawn from it and extended across the camera exposure platen 24 and wound on the spool 26 in the typical film loading cavity of the camera body 10.

When the memory module 40 and cartridge 30 are installed in the camera or in film processing equipment, the three, or in this case n, conductive segments are positioned to be in electrical contact with a set of at least four or n+1 terminal pins that extend from a terminal block 16 and are electrically coupled to the camera electronic operating system including the camera electronic control system 18. A centrally disposed conductive pad and additional terminal pin cooperate to couple operating voltage to the memory. The camera body 10 is thus modified in accordance with the invention by the incorporation of the terminal set $14_1$–$14_5$ of five, or in this case n+2, terminal pins that extending toward the end of the receptacle for the film cartridge 30 and memory module 40.

The individual terminal pins of the set $14_1$–$14_5$ may take the form of spring-loaded, bullet nose pins extending from spring and pin retaining receptacles through a non-conductive retainer wall of the terminal block 16 into the camera body receptacle for the film cartridge 30 as shown in the above-referenced '855 patent. The insertion of the cartridge 30 into the receptacle causes the bullet nose ends of the pins of the terminal set $14_1$–$14_5$ to retract against their springs while riding in contact on the upper surface of the memory module 40.

The centrally disposed terminal pin, designated $14_1$, extends toward the center of the receptacle for the film cartridge 30 in order to contact the centrally disposed conductive pad of the memory module 40. The remaining n+1 terminal pins $14_2$–$14_5$ are arrayed equally spaced in a circle around the terminal pin $14_1$ at 90° from one another and extend toward the receptacle in order to contact the conductive arcuate segments in the concentric band around the centrally disposed pad of the memory module 40 depicted in FIG. 2.

FIG. 1 schematically illustrates the interconnection of certain port pins of a microcontroller within the camera electronic control system 18 with the terminal pins $14_1$–$14_5$ through the power, clock and data transfer lines generally depicted as 20 and 22. The camera electronic control system 18 provides a regulated source voltage Vcc on line 20 through terminal block 16 to the centrally disposed terminal pin $14_1$. The application of serial clock (SCL), serial data (SDA) and system ground (Vss) on lines 22 to three of the remaining four terminal pins $14_2$–$14_5$ depends on the correct identification of the respective arcuate conductive segment of the memory module that is internally connected to the respective SCL, SDA and Vss input/output terminals of the EEPROM as described hereafter.

Figure 3:
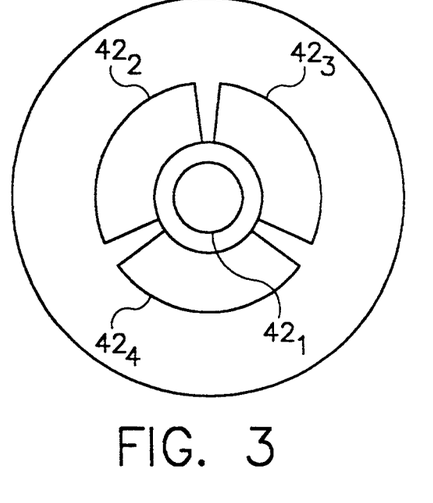
FIG. 3 is top view of the memory module depicting the conductive arcuate segments and centrally disposed conductive pad apparent from the upper surface of the memory module.
Figure 4:
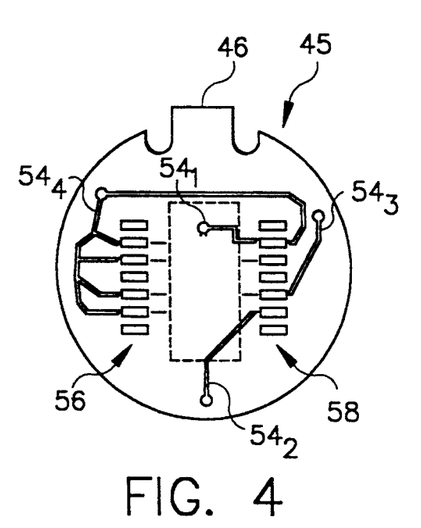
FIG. 4 is a bottom view of the printed circuit board within the memory module to which the integrated circuit memory or EEPROM is attached.
Figure 5:
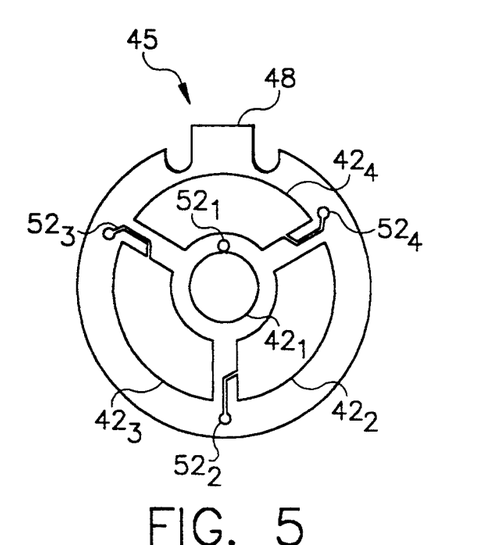
FIG. 5 is a top view of the printed circuit board of FIG. 4 depicting the conductive pads and arcuate segments coupled to printed circuit pathways.
Figure 6:
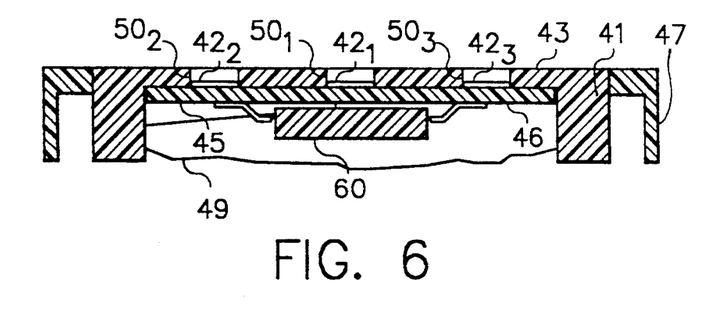
FIG. 6 is a cross-section elevation view of the memory module of the present invention showing of the enclosure of the printed circuit board and integrated circuit memory and an attachment mechanism for attaching the memory module to the end of a film cartridge.

Turning now to FIG. 3, it depicts in a simplified top view, the configuration of the centrally disposed pad $42_1$ and the conductive arcuate segments $42_2$–$42_4$ formed as printed circuits on the upper surface of a printed circuit board within the disc-shaped memory module 40 as described hereafter with respect to FIGS. 4–6. The conductive pad $42_1$ is a solid circular conductive dot at the center of the disc-shaped memory module 40. Each of the conductive pad and the arcuate segments $42_1$–$42_4$ is separated and electrically insulated from one another.

In the convention depicted in FIG. 3, the arcuate segments $42_2$, $42_3$ and $42_4$ are electrically connected internally to the SDA input/output terminal, the SCL input terminal and the Vss input terminal of the EEPROM, respectively, as described hereafter. The centrally disposed pad $42_1$ is electrically connected to the power input terminal of the EEPROM. This numbering relationship applies to the remaining description of the illustrated embodiments.

Each conductive pad or segment $42_1$–$42_4$ may be of a width that is greater than the diameter of the contacting end of the bullet nose shaped ends of the pins of the terminal set $14_1$–$14_5$, so that a fit tolerance is effective to allow for the attachment of the memory module housing 41 somewhat off-center with respect to the end of the film cartridge 30. Too great an off-center attachment error is prevented simply because the so-attached module housing 41 would prevent the insertion of the cartridge 30 into the receptacle in the camera body 10. Moreover, since battery power Vcc is applied through the centrally disposed terminal $14_1$, a failure to make contact with the central pad $42_1$ will be detected and an error message may be displayed through an on-camera display panel to alert the user to check for the absence or displacement of the memory module.

Figure 2:
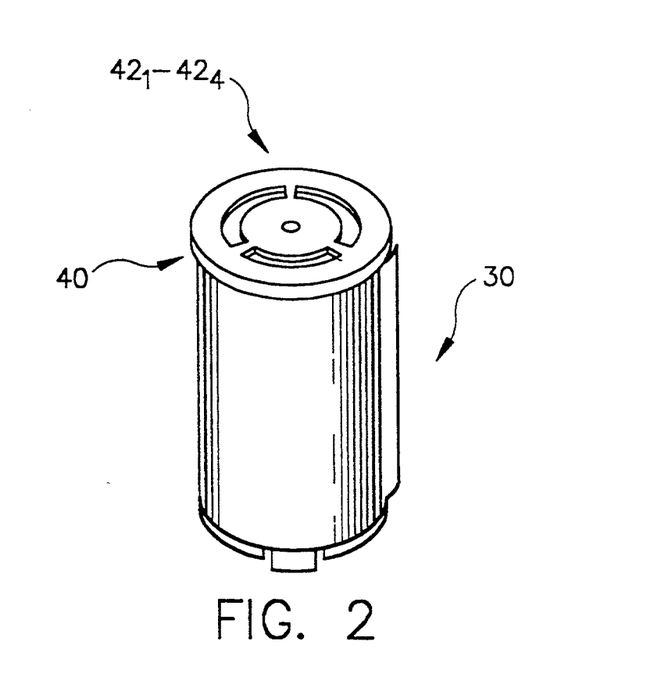
FIG. 2 is an illustration of the memory module in relation to a film cartridge.

The internal components of the disc-shaped memory module 40 are shown in FIG. 6. The memory module 40 has an external housing 41 with an upper surface 43 and a lower surface 44 and a diameter generally corresponding to the diameter of an end of the film cartridge 30. The attachment mechanism may preferably take the form of a snap-on cap fitting over or within the rim of the film cartridge 30, that can be releasably attached in any orientation as shown in FIG. 2. The snap-on cap is formed as a ring-shaped clip 47 attached to the periphery of the memory module housing 41.

A disc-shaped printed circuit board 45 having bottom and top surfaces 46 and 48 illustrated in FIGS. 4 and 5, respectively, is fitted within the confines of the housing 41 so that the pattern of the conductive pad and arcuate segments $42_1$–$42_4$ spaced apart and electrically isolated from one another on the upper surface 48 faces the respective openings or contact holes $50_1$–$50_4$ extending through the housing 41 corresponding in shape to the conductive pad and segments $42_1$–$42_4$. Thus, in this embodiment, the housing 41 has a pattern of contact holes $50_1$–$50_4$ extending through the housing 41, each contact hole shaped to match the pattern of the conductive pad and arcuate segments $42_1$–$42_4$ on the upper surface of the printed circuit board 45. The contact holes $50_1$–$50_4$ provide access for the terminal pin set $14_1$–$14_5$ to make electrical and mechanical contact with the conductive pad and arcuate segments $42_1$–$42_4$ on the upper surface 48 of the printed circuit board 45.

An integrated circuit chip, e.g. a non-volatile EEPROM chip 60, is attached to the lower surface 46 of the printed circuit board 45 and has a plurality of input and output terminals that are electrically connected by lead wires 62, 64 to certain pads of the first and second pad arrays 56 and 58 and thereby to printed circuits $54_1$–$54_4$ formed on the lower surface 46. The upper surface conductive pad and arcuate segments $42_1$–$42_4$ and the lower surface printed circuits $54_1$–$54_4$ are connected together through holes extending through the printed circuit board 45 filled with conductive material and connecting the respective printed circuits $52_1$–$52_4$ on upper surface 48 with the lower surface 46 printed circuits $54_1$–$54_4$.

The EEPROM chip 60 is attached to the printed circuit on the lower surface 46 of the printed circuit board 45 in the position shown in the dotted outline in FIG. 4 and as shown in FIG. 6. An epoxy fill material 49 is layered over the lower surface of the printed circuit board 45 and the EEPROM chip 60 to encapsulate and protect them. In order to miniaturize the assembly further and make it more cost effective, the EEPROM could be bonded in die form, rather than in chip form, to the lower surface of the printed circuit board 45. The EEPROM chip 60 may be a XICOR 24C16 or any similar EEPROM conforming to the Inter-Integrated Circuit ($I_2C$) Bus protocol described in the "80C51 and Derivative Microcontrollers" handbook pages 131–149, published by Phillips in 1991.

Figure 7:
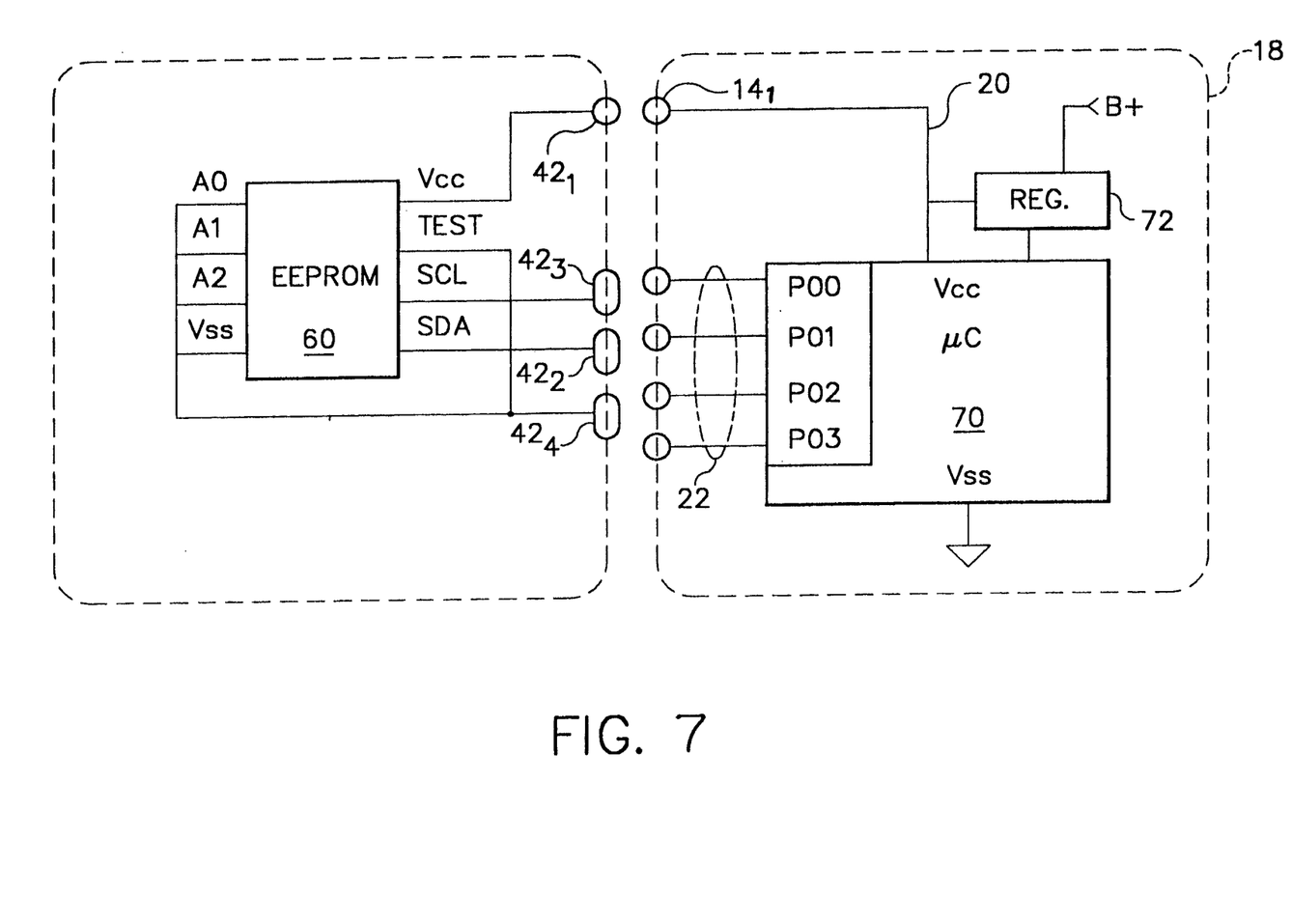
FIG. 7 is a circuit diagram of the interconnection of the EEPROM and the microcontroller and power supply of the camera electronic control system.

The wiring diagram of the EEPROM chip 60 depicts eight terminals that are connected to the upper surface conductive pad and arcuate segments $42_1$–$42_4$ as shown in the schematic diagram of FIG. 7 in conjunction with the printed circuit illustrations of FIGS. 4 and 5, as described above. The camera electronic control system block 18 includes (among other components not illustrated) the microcontroller 70 and a regulated power supply 72 coupled to a battery (not shown). The regulated power supply 72 is enabled by microcontroller 70 to supply the regulated voltage Vcc on line 20 to terminal pin $14_1$ which is in contact with the central pad $42_1$ that in turn is connected to the VCC terminal of EEPROM 60. The microcontroller port pins P00, P01, P02, P03 are connected through the lines 22 to the four terminal pins $14_2$–$14_5$ which are positioned as described above to contact the region of the three arcuate segments $42_2$–$42_4$. In accordance with the processes described hereafter, the microcontroller 70 operates to determine the identity of the port pins that are in electrical connection with the SDA, SCL, and VSS terminals, to memorize the identifications, and to enable the port pins to read or write serial data from or to the EEPROM 60. The system ground or Vss is thereby coupled to arcuate segment $42_4$, serial data or SDA is transmitted via arcuate segment $42_2$, and serial clock or SCL is transmitted via arcuate segment $42_3$. The microcontroller 70 is preferably a Mitsubishi M38223M4 having internal pull-up resistors and sufficient output current sinking capability to power the EEPROM 60.

In order to conform to the $I^2C$ standard, pull-up resistors must be present on the SDA and SCL control lines. The microcontroller 70 of the camera electronic control system 18 has internally programmable pull-up resistors that principally function to enable proper serial communication with the EEPROM 60. After identification of the port pins connected with the SCL and SDA terminals, the pull-up resistors for the respective port pins connected thereto are programmed in so that these port pins are set to be at a fixed logic level, 1. The fixed logic level keeps the I/O port pin from drifting between clock and data transmissions. Pull-up resistors are not programmed in for the port pin or port pins coupled to the VSS terminal to avoid increasing current consumption demands on the microcontroller 70.

After the three port pins are identified as SDA, SCL, and Vss, system ground is coupled to the Vss port pin, and data is stored by writing address and data on the SDA port pin synchronously with the clock applied at the SCL port pin. The address identifies the EEPROM 60 and the data storage location. Between each address and data byte, an acknowledge bit is generated by the EEPROM 60 that is read back through the SDA port pin that indicates a successful data transfer.

The acknowledge bit signal is also employed in the process of the present invention to indicate that an interrogation data signal has been received and successfully transferred into memory. The failure to receive an acknowledge signal in response to an identification interrogation or test data signal is employed as an indicator that the assumption of the identity of the contacted arcuate segment is incorrect and triggers the test program to go to the next assumption and to attempt the next data transfer.

Figure 8:
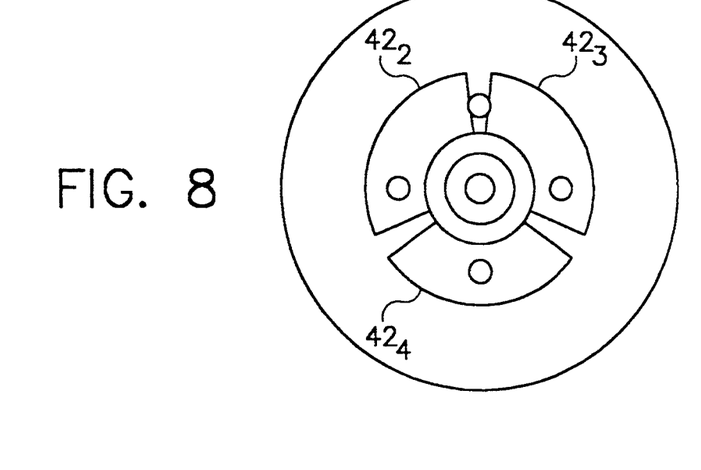
FIG. 8 is an illustration of a first possible contact pattern of n+1 terminal pins of the camera with n equally spaced and sized conductive arcuate segments.
Figure 9:
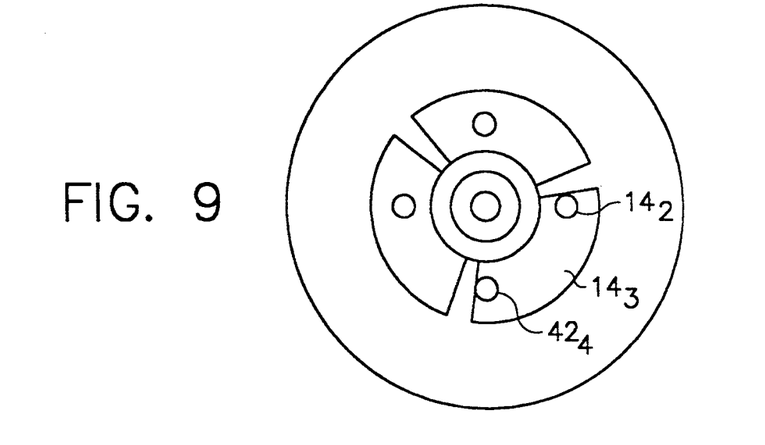
FIG. 9 is an illustration of a second possible contact pattern of n+1 terminal pins of the camera with n equally spaced and sized conductive arcuate segments.

The process for identifying the connection of the input/output port pins to the respective EEPROM terminals is explained with reference to first and second possible contact positions of the terminal pins $14_2$–$14_5$ with respect to the first embodiment as illustrated in FIGS. 8 and 9. The battery power Vcc is always applied by centrally disposed terminal $14_1$ in contact with conductive pad $42_1$. In the first position, shown in FIG. 8, one of the four or n+1 terminal pins $14_2$–$14_5$ falls between the three or n conductive arcuate segments. In the second position shown in FIG. 9, two adjacent terminal pins, arbitrarily designated $14_2$ and $14_3$, fall on the same conductive arcuate segment, arbitrarily designated $42_4$, which is coupled electrically to Vss. Thus two cases are illustrated for equally dimensioned conductive segments whose centers are 120° apart, which results in up to twelve possible contact combinations of the three segments and the four terminal pins.

In operation, when initial contact is made between the centrally disposed terminal $14_1$ and the conductive pad $42_1$, a routine is started by the microprocessor to confirm continuity between any two adjacent ones of the n+1 or four terminal pins $14_2$–$14_5$, indicating that they are contacting the same one of the n or three arcuate segments. If continuity is detected between any two adjacent terminal pins, indicating the position of two terminal pins on the same arcuate segment as illustrated in FIG. 9, then only one of the two port pins is selected for testing and use, and the output of one terminal pin/port pin is disregarded.

In this case, the routine then moves to testing contact combinations by assuming the identity of the contacted conductive arcuate segments and attempting to communicate with the EEPROM chip 60 using the data communication protocol. If no acknowledge signal is received in response to an attempted read or write command, then the routine moves to another assumed identity of the segments and the attempt to communicate is repeated. The total number of attempts necessary to confirm the orientation in this case is three, as set forth in Table I (assuming that terminal $14_5$ is in common) as follows:

TABLE I

| TERMINAL | CONTACT COMBINATIONS | | |
|---|---|---|---|
| $14_2$ | VSS | SCL | SDA |
| $14_3$ | SDA | VSS | SCL |
| $14_4$ | SCL | SDA | VSS |

However, if one of the terminal pins rests on an insulating space between adjacent arcuate segments as depicted in FIG. 8, no common pair of terminal pins can be identified, and the identity of the terminal resting on insulation is unknown. In this case, the routine makes a starting assumption of the position of all of the n+1 or four terminal pins $14_1$–$14_4$ with respect to four possible contact positions and tries to communicate with the EEPROM using the established protocol. Until the acknowledgement is received, the routine continues to try new terminal and contact combinations. The total number of combinations is twelve as shown in the following Table II which lists the trial assumptions in each column for the four terminal pins $14_2$–$14_5$:

TABLE II

| CONTACT $14_2$–$14_5$ COMBINATION ASSUMPTIONS | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| INS | INS | INS | SCL | SDA | VSS | SDA | VSS | SCL | VSS | SCL | SDA |
| VSS | SCL | SDA | INS | INS | INS | SCL | SDA | VSS | SDA | VSS | SCL |
| SDA | VSS | SCL | VSS | SCL | SDA | INS | INS | INS | SCL | SDA | VSS |
| SCL | SDA | VSS | SDA | VSS | SCL | VSS | SCL | SDA | INS | INS | INS |

In Table II, INS indicates the assumption that the terminal is in contact with the insulating layer between adjacent segments. One of the assumptions of the contact combination tried will prove correct, and the correct combination will be stored in memory in the microcontroller 70 and employed in subsequent communication with the EEPROM 60 to effect storage and retrieval of data therein, e.g. data related to the exposure of each image frame on the film 32, for use in processing and making prints from the exposed images or for other uses.

Figure 10:
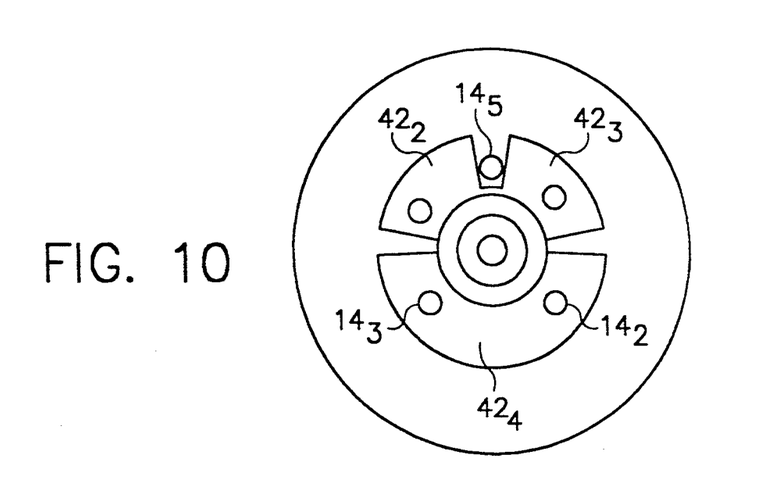
FIG. 10 is top view of the memory module depicting a further embodiment of the n conductive arcuate segments and the centrally disposed conductive pad and illustrating a possible contact pattern of n+2 contact terminal pins of the camera therewith.

A further variation on the contact pattern of the conductive arcuate segments $42_2$–$42_4$ is depicted in FIG. 10. In this variation, the segment $42_4$ labeled Vss is larger than the SDA and SCL segments and would be employed with a terminal set of five, rather than four, terminal pins arrayed to contact the band in which the three segments reside. The five terminal pins would be arrayed at 72° radial intervals so that at least two terminal pins would always make contact with the larger Vss segment. In FIG. 10, for example, two terminal pins are shown in contact with the segment $42_4$ coupled to Vss, and one terminal pin $14_5$ contacts the insulating material between segments $42_2$ and $42_3$ respectively coupled to the SDA and SCL terminals of the EEPROM 60.

The common contact of two terminal pins $14_2$ and $14_3$ may be determined by testing for electrical common connections at adjacent port pins, which identifies the location of the segment $42_4$. With segment $42_4$ located, the starting assumptions of identification sets to be applied in the testing of the adjacent terminal pins to the right and left of the common contacting terminal pins is simplified, unless there are two sets of two adjacent terminal pins contacting two of the three arcuate segments. In such a case, it is necessary to make an initial assumption of the identity of one of the two segments as coupled to the Vss terminal of the EEPROM 60 and to test the other two segments with SCL and SDA identification assumptions. If the assumptions fail, then a further assumption is made that the other commonly contacted segment is coupled to the Vss terminal of the EEPROM 60, and that assumption is tested.

In any case, it is advantageous to have two terminal pins, coupled to two I/O port pins of the microcontroller 70, in contact with the Vss terminal of the EEPROM 60 through the widened segment $42_4$ in case a microcontroller that is incapable of meeting the current sinking requirements of the EEPROM 60 is employed. Both of the commonly contacting I/O port pins may be enabled in parallel, so that the microcontroller 70 can sink the operating current of the EEPROM 60 while at a logic level "low". The operating "write" current for the above specified EEPROM 60 is 3 mA, while certain microcontrollers, e.g. the Motorola M68HC11A8 can only deliver 1.6 mA per I/O port pin. The parallel contact of two terminal pins with the single VSS segment $42_4$ thus allows a current sink up to 3.2 mA.

In use, the detachable memory module 40 is employed in a camera electronic control system for recording information of the type itemized in the above referenced patents related to the camera exposure parameters of film image frames for subsequent read-out and for other uses as set forth therein. Pre-recorded data may be stored in the memory module specific to various film types and retrieved by the microcontroller for use in the camera electronic control system with respect to the particular type of film (otherwise read-out by the camera) that the module is attached to for use with other data derived from the camera operating systems to affect exposure of each image frame.

Although the invention is described as having particular application to releasable memory modules, it will be understood that the module could be permanently attached to the film cartridge 30.

The attachment of the memory module 40 to the end of the film cartridge 30 is position insensitive, within the general constraint of fitting it centrally to the end of the cartridge. Moreover, attachment is not dependent on the particular configuration of the end nor does it have to be permanent or require modification of standard film cartridges. Consequently, the memory module may be readily implemented for use with cameras designed with the read/write capability described above but otherwise capable of accepting standard film cartridges with or without the memory module attached. And the photographer may be expected to easily attach the memory module to the standard film cartridge without having to be concerned about precise positioning of the module with respect to the terminal pins.

Although the present invention has been fully described with reference to the preferred embodiments thereof, many modifications and variations thereof will

PARTS LIST FOR FIGS. 1-10 camera body 10
viewfinder 12
set $14_1$–$14_5$ of five terminal pins
terminal block 16
camera electronic control system 18
Vcc line 20
data, clock and ground transfer lines 22
camera exposure platen 24
spool 26
film cartridge 30
film 32
memory module 40
disc-shaped module housing 41
conductive pad $42_1$
conductive arcuate segments $42_2$–$42_4$
housing upper surface 43
housing lower surface 44
disc-shaped printed circuit board 45
printed circuit board lower surface 46
ring-shaped clip 47
printed circuit board upper surface 48
epoxy fill material 49
contact holes $50_1$–$50_4$
upper printed circuits $52_1$–$52_4$
lower printed circuits $54_1$–$54_4$
terminal arrays 56, 58
EEPROM chip 60
lead wires 62, 64
microcontroller 70
regulated power supply 72

What is claimed is:

1. A memory module for a film cartridge in which information related to the exposure of film image frames may be recorded in memory for subsequent read-out, the memory module having a module housing having an upper and a lower surface, an integrated circuit chip, including a memory, attached within the module housing and having a plurality of input and output terminals, and means for attaching the module housing to the film cartridge so that the upper surface is exposed for making electrical contact with data recording and read out terminal pins of camera and film processing equipment arranged in a fixed pin array with respect to a receptacle for receiving the attached module housing and film cartridge oriented toward said data recording and read out terminal pins, said memory module further characterized by:

a substrate having a plurality of conductive contact surfaces spaced apart and electrically isolated from one another and formed in a predetermined pattern, said plurality of conductive contact surfaces being less in number than the number of data recording and read out terminal pins;

means for making electrical connections between the plurality of input and output terminals of the integrated circuit chip memory and the plurality of conductive contact surfaces; and means for positioning the substrate so that said plurality of conductive contact surfaces face toward the upper surface of the module housing and may all be contacted by said data recording and read out terminal pins when the memory module is positioned in respect thereto, wherein said positioning means allows the common contact of at least two of the data recording and read out terminal pins with a single one of said plurality of contact surfaces in at least one position of the substrate.

2. The memory module of claim 1 wherein:
the memory module is disc-shaped;
the substrate includes a conductive pad disposed at the central point of the disc-shaped memory module; and
the means for making electrical connections includes means for connecting the conductive pad to a power terminal of the integrated circuit chip.

3. The memory module of claim 2 wherein:
the plurality of contact surfaces is arranged on the substrate in spaced-apart arcuate segments positioned in a band surrounding the centrally disposed conductive pad.

4. The memory module of claim 2 wherein said attaching means further comprises clip means formed on the periphery of the module housing and dimensioned with respect to a peripheral edge portion of the end of the film cartridge to be releasable attached thereto without regard to the angular orientation of the module housing to the edge portion.

5. The memory module of claim 2 wherein the plurality of conductive contact surfaces comprise a plurality of equally spaced and sized, arcuate conductive segments electrically isolated from one another and positioned in a circular band around the center pad and collectively forming n contact surfaces.

6. The memory module of claim 2 wherein the plurality of conductive contact surfaces comprise a plurality of unequally spaced and sized arcuate conductive segments electrically isolated from one another and positioned in a circular band around the center pad and collectively forming n contact surfaces.

7. The memory module of claim 1 wherein the attaching means further comprises clip means formed on the periphery of the module housing and dimensioned with respect to a peripheral edge portion of the end of the film cartridge to be releasable attached thereto without regard to the angular orientation of the module housing to the edge portion.

8. The memory module of claim 1 wherein the plurality of conductive contact surfaces comprise a plurality of equally spaced and sized, arcuate conductive segments electrically isolated from one another and positioned in a circular band on the substrate.

9. The memory module of claim 1 wherein the plurality of conductive contact surfaces comprise a plurality of unequally spaced and sized, arcuate conductive segments electrically isolated from one another and positioned in a circular band on the substrate.

10. In a system for recording and reading information related to the exposure of film image frames in a memory module associated with a film cartridge for subsequent read-out, wherein the memory module is of the type having a set of at least n conductive contact surfaces arrayed in a spaced apart pattern in a region and having an integrated circuit, including a memory, positioned in the module and having a further set of N electrical input and output terminal pins electrically connected in a predetermined order to the set of n conductive contact surfaces, and wherein the camera and film processing equipment is of the type having a housing for receiving the film cartridge with the attached memory module in a cartridge receiving chamber and a set of at least n+1 contact terminal pins positioned by the housing to extend into the cartridge receiving chamber and bear against and make electrical contact with the region occupied by the set of n conductive contact surfaces, whereby at least one contact terminal may be in contact with each of the n conductive contact surfaces when the film cartridge and memory module are positioned in the cartridge receiving chamber, apparatus for identifying which of the n contact terminal pins is in contact with the n contact surfaces which are in turn coupled to the input and output terminals of the integrated circuit further comprising:

means for identifying which, if any, of the n+1 contact terminal pins are commonly contacting a single one of the n contact surfaces and for selecting only 1 of the contact terminal pins in common contact with a single contact surface;

means for successively assuming the identity of the set of n remaining contact terminal pins including the selected 1 of the contact terminal pins until the correct assumption is confirmed;

means for successively testing the assumptions of the identity of the remaining n contact terminal pins; and means for confirming the correct assumption identifying the specific ones of the N input or output terminals of the integrated circuit to which each of the remaining n contact terminal pins are in electrical communication with and for halting the operation of the assuming and testing means.

11. The system of claim 10 wherein:

the assuming means further comprises means for generating a set of test signals representing the assumed input or output signals appropriate to the operation of the N input or output terminals of the integrated circuit assumed to be coupled to the set of n contact surfaces; and the testing means further comprises means for applying the assumed set of test signals to the set of n contact surfaces.

12. The system of claim 11, wherein the memory module is of the type comprising:

a disc-shaped module housing having an upper and a lower surface and a diameter generally corresponding to the diameter of an end of the film cartridge, wherein the set of n conductive contact surfaces is arrayed in a spaced apart pattern in a region accessible from the upper surface of the disc-shaped module housing;

and further comprising:

means for attaching the disc-shaped module housing to the end of a film cartridge so that the set of n conductive contact surfaces is exposed for making electrical contact with at least n of the n+1 data recording and reading terminal pins of the camera and film processing equipment.

13. The system of claim 10, wherein the memory module is of the type comprising:

a disc-shaped module housing having an upper and a lower surface and a diameter generally corresponding to the diameter of an end of the film cartridge, wherein the set of n conductive contact surfaces is arrayed in a spaced apart pattern in a region accessible from the upper surface of the disc-shaped module housing;

and further comprising:

means for attaching the disc-shaped module housing to the end of a film cartridge so that the set of n conductive contact surfaces is exposed for making electrical contact with at least n of the n+1 data recording and reading terminal pins of the camera and film processing equipment.

14. The system of claim 13 wherein:

the camera and film processing equipment is provided with a further terminal pin; and a further contact surface is formed as a pad in the center of the accessible upper region of the memory module and disposed for contact by the further contact terminal pin of the camera and film processing equipment, regardless of the orientation of the disc-shaped module housing on the end of the film cartridge.

15. The memory module of claim 14 wherein the set of n conductive contact surfaces comprises n equally spaced and sized arcuate segments electrically isolated from one another and positioned in a circular band around the center pad.

16. The memory module of claim 13 wherein the set of n conductive contact surfaces comprises n unequally spaced and sized arcuate segments electrically isolated from one another and positioned in a circular band around the center pad.

17. The memory module of claim 13 wherein the attaching means further comprises clip means formed on the periphery of the module housing and dimensioned with respect to a peripheral edge portion of the end of the film cartridge to be releasable attached thereto without regard to the angular orientation of the module housing to the edge portion.

18. In a method for recording and reading information related to camera exposure parameters of film image frames in a memory module associated with a film cartridge for subsequent read-out, wherein the memory module is of the type having a set of n conductive contact surfaces arrayed in a spaced apart pattern in a region and having an integrated circuit, including a memory, positioned in the module and having a further set of N electrical input and output terminals electrically connected in a predetermined order to the set of n conductive contact surface, and wherein the camera and film processing equipment is of the type having a housing for receiving the film cartridge with the attached memory module in a cartridge receiving chamber, a set of at least n+1 contact terminal pins positioned by the housing to extend into the cartridge receiving chamber and bear against and make electrical contact with the region occupied by the set of n conductive contact surfaces whereby at least one contact terminal is in contact with each of the n conductive contact surfaces, the method of identifying which n of the n+1 contact terminal pins is in contact with the n contact surfaces which are in turn coupled to the input and output terminals of the integrated circuit comprising the steps of:

identifying which, if any, of the n+1 contact terminal pins are commonly contacting a single one of the n contact surfaces and selecting only 1 of the contact terminal pins in common contact with a single contact surface;

assuming the identity of the set of n remaining contact terminal pins;

testing the assumption of the identity of the remaining n contact terminal pins; and confirming the correct assumption identifying the specific ones of the N input or output terminals of the integrated circuit to which each of the remaining n contact terminal pins are in electrical communication with.

19. The method of claim 18 wherein the testing step further comprises:
applying a set of test signals representing the assumed input or output signals appropriate to the operation of the N input or output terminals of the integrated circuit assumed to be coupled to the set of n contact surfaces.

20. The method of claim 18, wherein the memory module is of the type comprising:
a disc-shaped module housing having an upper and a lower surface and a diameter generally corresponding to the diameter of an end of the film cartridge, wherein the set of n conductive contact surfaces is arrayed in a spaced apart pattern in a region accessible from the upper surface of the disc-shaped module housing;

and further comprising:
means for attaching the disc-shaped module housing to the end of a film cartridge so that the set of n conductive contact surfaces is exposed for making electrical contact with at least n of the n+1 data recording and reading terminal pins of the camera and film processing equipment.

21. The method of claim 20 wherein the memory module further comprises a further contact surface formed as a pad in the center of the accessible upper region and disposed for contact by a further contact terminal pin of the camera and processing equipment, regardless of the orientation of the disc-shaped module housing on the end of the film cartridge.

22. The method of claim 21 wherein the set of n conductive contact surfaces comprises n equally spaced and sized arcuate segments electrically isolated from one another and positioned in a circular band around the center pad.

23. The method of claim 21 wherein the set of n conductive contact surfaces comprises n unequally spaced and sized arcuate segments electrically isolated from one another and positioned in a circular band around the center pad.

* * * * *